Jan. 9, 1951 J. J. HUITEMA 2,537,586
STALK CUTTER
Filed Dec. 27, 1946 3 Sheets-Sheet 1

Inventor
John J. Huitema,
By *signatures*
Attorney

Jan. 9, 1951 J. J. HUITEMA 2,537,586
STALK CUTTER
Filed Dec. 27, 1946 3 Sheets-Sheet 2

Inventor
John J. Huitema
By
McMorrow, Berman & Davidson
Attorneys

Jan. 9, 1951 J. J. HUITEMA 2,537,586
STALK CUTTER
Filed Dec. 27, 1946 3 Sheets-Sheet 3
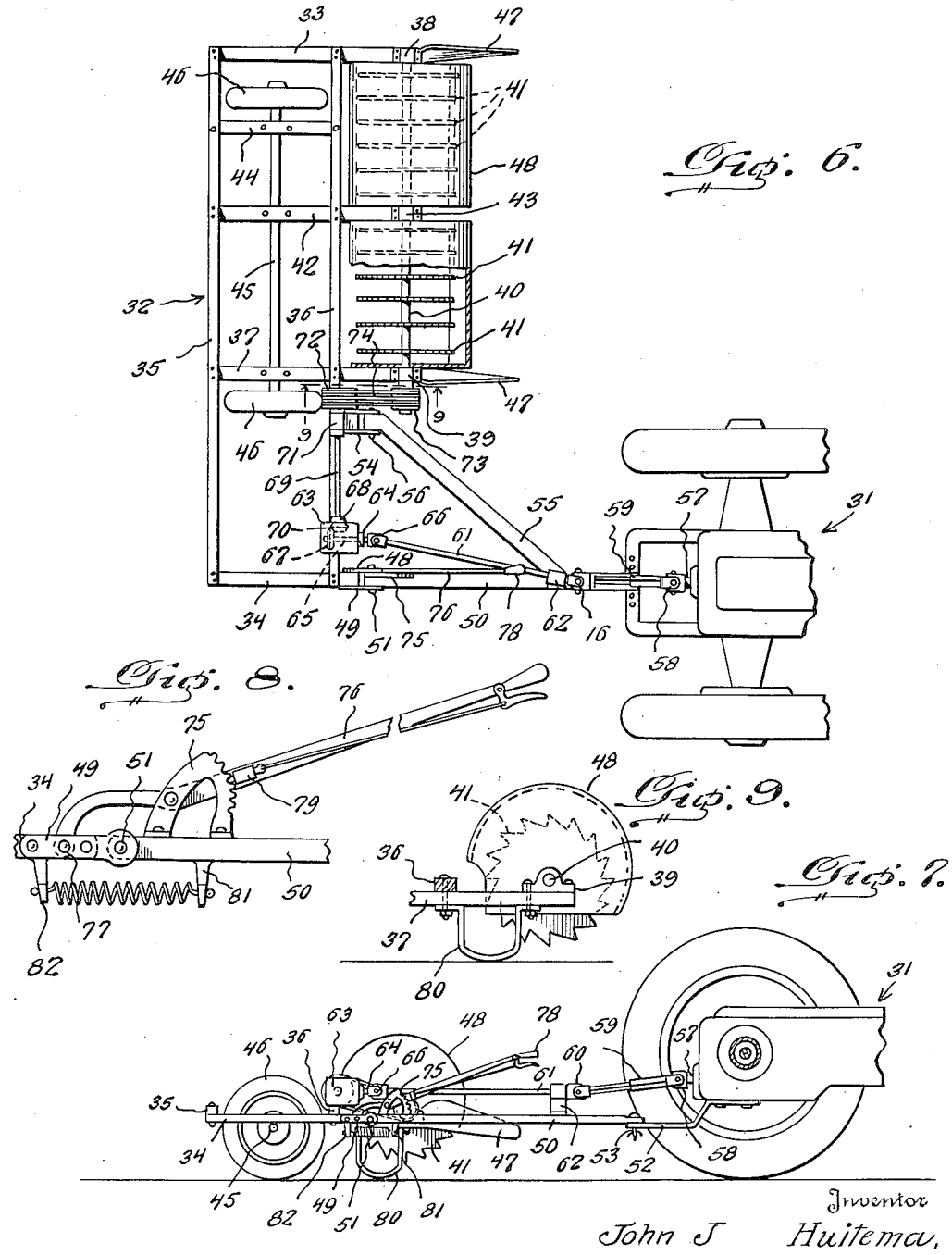

Patented Jan. 9, 1951

2,537,586

UNITED STATES PATENT OFFICE 2,537,586

STALK CUTTER

John J. Huitema, New Paris, Ind.

Application December 27, 1946, Serial No. 718,743

2 Claims. (Cl. 55—118)

The present invention relates to stalk cutters, and is more particularly concerned with a device to be mounted on and powered by a tractor.

The primary object of the invention is to provide a device of the character referred to which is provided with a plurality of powered cutters designed to slash or pulverize stalks so that they can be readily plowed under.

Another object of the invention is to provide a device of the character referred to wherein the rotary cutters are adjustable for cutting height.

A further object of the invention is to provide a device of the character referred to of simpler and more compact construction than prior devices.

With the foregoing and other objects and advantages in view, the invention consists of the novel construction and arrangement of parts hereinafter described and claimed.

In the accompanying drawings illustrating the invention:

Figure 6 is a top plan view of another modified form of the device hitched to the rear end of a trailer by which it is pulled forwardly.

Figure 7 is an elevational side view of the modified form of the device shown in Figure 6.

Figure 8 is a fragmentary elevational side view of the cutter-adjusting mechanism.

Figure 9 is a sectional view taken on line 9—9 of Figure 6.

Like numerals, as used in the description and drawings, designate the same parts of construction.

The device is constructed to work on two rows of stalks at a time and to be moved in a forward direction by a tractor to which it is hitched.

Figure 1:
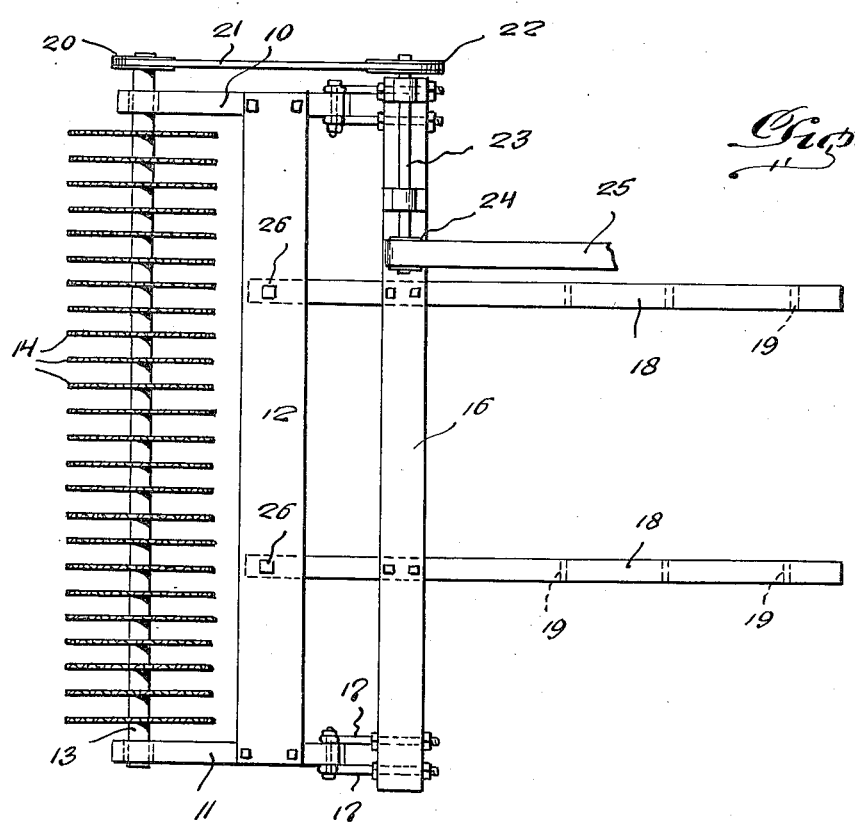
Figure 1 is a top plan view of the device.
Figure 2:
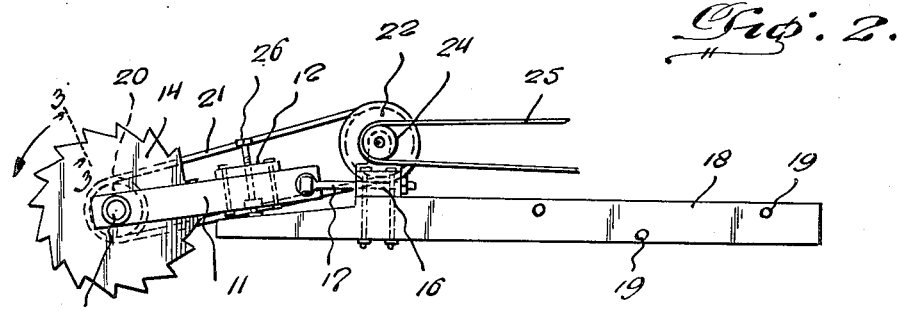
Figure 2 is a side elevation thereof.
Figure 3:
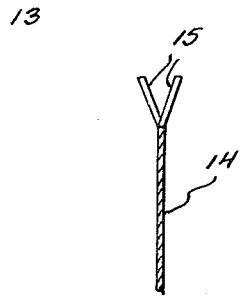
Figure 3 is a fragmentary section on line 3—3 of Figure 2.

Referring to the embodiment of the invention illustrated in Figures 1 and 2, the frame of the device consists of two parallel side bars 10 and 11 connected by a truss bar 12 and supporting in front a rotatable cutter shaft 13.

Mounted on said shaft are a plurality of toothed cutting discs 14 whose teeth are set alternately outward at a suitable angle, as at 15, for more effective use.

The side bars are hinged at the rear ends to a cross-bar 16 by pairs of swivel bolts 17 adjustable longitudinally and serving to allow vertical movement of the side bars. Cross-bar 16 is mounted on a pair of spaced parallel coupling arms 18 suitably apertured, as at 19, for attaching bolts to secure the device to the front of a tractor (not shown) which is hitched between the arms.

The cutter shaft 13 projects outside the side bar 10 and mounted fast thereon is a grooved pulley 20 which is connected by belt 21 to a pulley 22 on a shaft 23 mounted longitudinally on the cross-bar 16. On the opposite end of said shaft is mounted a band-belt pulley 24. The belt 25 which operates the pulley 24 is operated by the motor on the tractor.

The side arms 10 and 11, which are hinged at the rear ends, as heretofore explained, are designed to be lifted at the front ends, so as to adjust the height of the cutters. To facilitate such adjustment, the top sides of the hitch arms 18 are inclined downward from cross-bar 16 to their front ends, and resting on each incline is an adjustable bolt 26 threaded perpendicularly in said side arms. By turning said bolts, the arms are raised or lowered, as desired.

It will be observed that the above-described power take-off is designed to rotate the toothed cutting discs clockwise, as indicated in Figure 2.

Figures 4, 5:
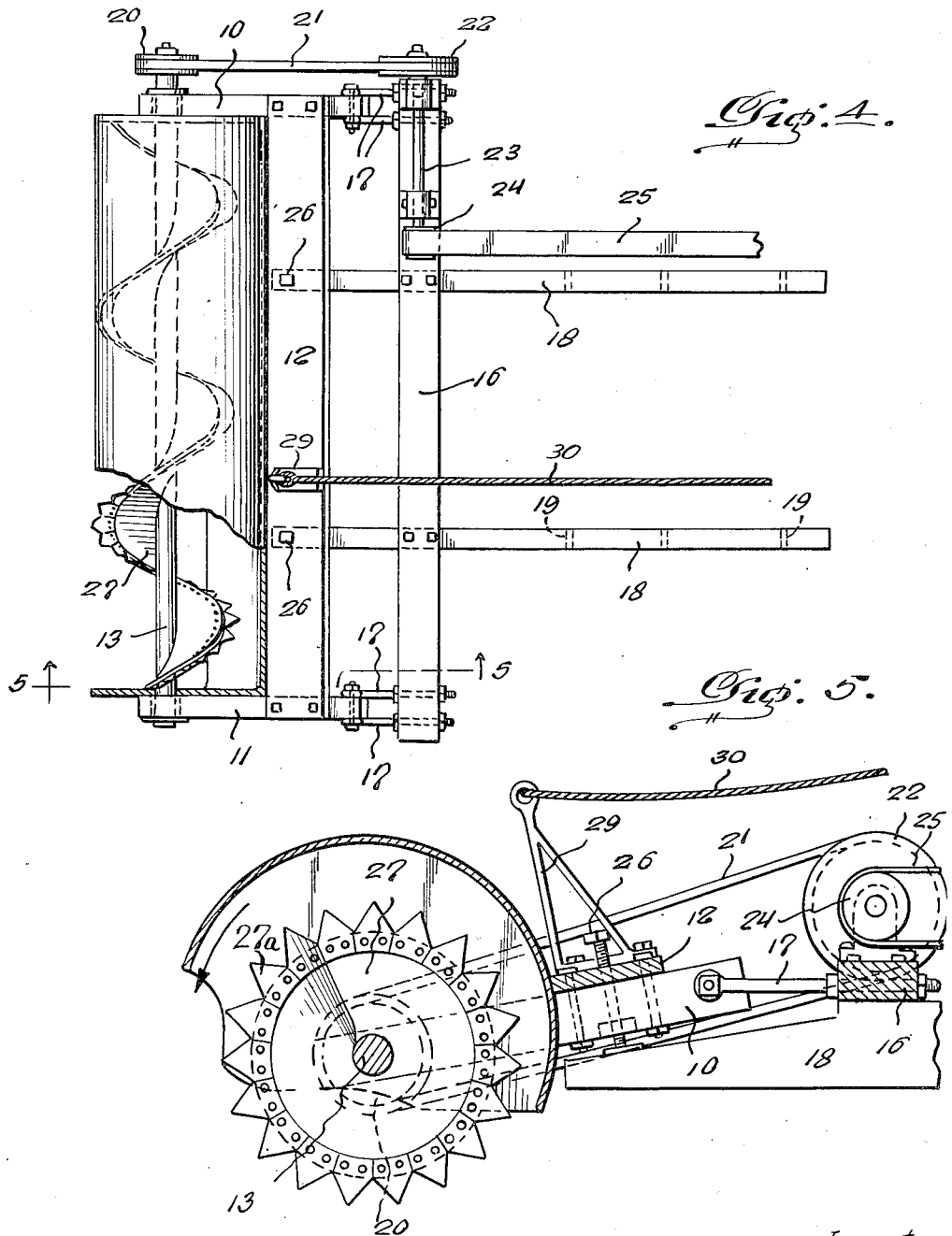
Figure 4 is a top plan view of a modified form of the device with a portion of the cutter shield broken away.
Figure 5 is a section thereof on line 5—5 of Figure 4.

Referring now to the modification, as shown in Figures 4 and 5, the same construction of frame and hitch is employed. The main difference is in the stalk cutters.

Instead of employing a plurality of spaced cutting discs with slanted teeth, an auger type of blade 27, with suitable teeth 27a, is mounted fast on the rotary shaft 13 and powered as explained for the first-described form of the invention. Like the disc cutters therein, this auger cutter also is rotated clockwise, as viewed in Figure 5, hence the lowermost portions of the auger cutter move reversely to the direction of travel of the tractor. In both forms, the cutters are rotated at a high rate of speed, a speed of 1750 R. P. M., having been used with good results.

A semi-circular shield 28 is secured between the side arms 10 and 11 and rests against the cross-beam 12, being positioned in relation to shaft 13 so as to cover the back portion of the auger cutter.

Mounted on the cross-beam 12 intermediate the ends is a perpendicularly disposed arm 29 with an eye at its top in which is secured a cable 30. The arm is suitably braced and serves in cooperation with the cable to lift the cutter and supporting frame.

Figures 6, 7, 8 and 9 illustrate a second modification of the stalk cutter according to my invention. This second modification is distinguished from the above-described forms mainly in that it is hitched to the rear of a tractor 31, so that the stalk cutter is pulled by the tractor instead of being pushed.

This modified stalk cutter has a frame 32 consisting of a left hand side arm 33 and a right hand side arm 34. A rear transverse bar 35 is arranged on top and fastened to the rear ends of the two side arms 33 and 34. A front transverse bar 36 extends parallel to the rear transverse bar 35 and is fastened on top of the two side arms 33 and 34 at a distance in front of the rear transverse bar 35.

The left side arm extends forwardly beyond the front transverse bar 35, and an intermediate longitudinal frame member 37 is fastened to the under sides of the two transverse bars 35 and 36 and is arranged parallel to the side arms 33 and 34 and extends forwardly beyond the front transverse bar 36 as far as the left side arm 33.

Adjacent the front ends of this side arm 33 and the intermediate frame member 37, bearings 38 and 39 are rigidly fastened to the top surfaces of these two members, and a shaft 40 is rotatably mounted in said bearings.

Two sets of stalk cutter discs 41 are rigidly mounted on the shaft 40 and the two sets of curter discs 41 are divided from each other by a second intermediate longitudinal frame member 42 fastened to the under sides of the two transverse bars 35 and 36 and extending forwardly of the front transverse bar 36 as far as the left side arm 33. A bearing 43 is firmly mounted on top of the front ends of the second intermediate longitudinal frame member 42 and receives the shaft 40 rotatably therein.

Between the left side arm 33 and the second intermediate longitudinal frame member 42 a short frame member 44 is located and is fastened to the under sides of the two transverse bars 35 and 36.

Centrally between these two bars a transverse axle 45 is rigidly mounted on the under sides of the three intermediate frame members 37, 42 and 44 and adjacent each of the two ends of this axle 45, which extend somewhat beyond the intermediate frame members 37 and 44, respectively, a pony wheel 46 is rotatably mounted on the axle 45.

The two sets of cutter discs 41 are arranged so that each set is adapted to cut one row of stalks, and on the forward ends of the left side arm 33 and the first-mentioned longitudinal intermediate frame member 37 a dividing board 47 is mounted extending forwardly therefrom.

A semi-cylindrical safety shield 48 covers the cutter discs 41, as best shown in Figure 9, and is secured to the inner surfaces of the portions of the left side arm 33 and the first-mentioned intermediate frame member 37, which extend forwardly of the front transverse bar 36.

The right side arm 34 extends a short distance forwardly of the front transverse bar 36, and a hinge plate 49 is secured to each side surface of this right side arm end. A hitch bar 50 is hingedly secured between the two hinge plates 49 by means of a pin 51 or the like with one of its ends, and the other end is secured to the hitch bracket 52 by a hitch pin 53.

A forked hinge bracket 54 is fastened to the front surface of the front transverse bar 36 at a distance to the right of the first-named intermediate frame member 37. A hitch brace member 55 is secured to the left side surface of the hitch bar 50 adjacent the front end thereof and extends rearwardly and to the left thereof. The free end of this brace member extends straight rearwardly and is arranged inside the forked hinge bracket 54 to which it is hingedly secured by a pin 56 or the like.

To the shaft 57 of the power take-off of the tractor 31 a universal joint 58 is secured, with which a telescopic slip shaft 59 is connected. On the rear end of the slip shaft another universal joint 60 is provided, and a drive shaft 61 is attached to the rear end of the second universal joint 60 and extends rearwardly and to the left therefrom and is rotatably supported in a bearing 62 secured on top of the hitch bar 50.

A transmission housing 63 is rigidly mounted on the front transverse bar 36 at a distance to the left from the right side arm 34. On the front of this housing, a bearing boss 64 is formed rotatably supporting a stub shaft 65 extending into the transmission housing 64. On the front end of this stub shaft a third universal joint 66 is mounted which is attached to the rear end of the drive shaft 61.

On the inner end of the stub shaft 65, a bevel gear 67 is rigidly mounted. On the left side of the transmission housing, another bearing boss 68 is formed rotatably supporting a transmission shaft 69. A second bevel gear 70 is rigidly mounted on the inner end of the transmission shaft 69 inside the housing 63 and meshes with the first bevel gear 67. A bearing 71 is mounted on the front transverse bar 36 at a distance to the right from the first intermediate frame member 37 and receives the transmission shaft 69 rotatably therein. On the end of the transmission shaft protruding beyond the bearing 71, a grooved pulley 72 is rigidly mounted and a corresponding pulley 73 is rigidly mounted on the cutter shaft 40. Transmission belts 74 are trained over the two pulleys.

A latch bracket 75 is secured on top of the hitch bar 50 adjacent the rear end thereof, and an adjusting lever 76 is pivotally mounted on said bracket. The short rear end of the adjusting lever 76 extends between the two hinge plates 49 back of the hinge pin 51 and is pivotally connected with these plates by a pivot pin 77. The comparatively long front end of the adjusting lever has a hand grip 78 and a spring-biased latch 79 of well known construction is adapted to engage the latch bracket 75 to secure the adjusting lever 76 and the rear frame 32 including the pony wheels thereon in adjusted position.

Underneath the left side arm 33 and the first intermediate frame member 37, U-shaped runners 80 are secured just in the rear of the cutter shaft 40 to prevent the cutter discs from striking the ground.

On the under side of the rear end of the hitch bar 50, a lug 81 is formed and a corresponding lug 82 is provided underneath the front end of the right side arm 34. A helical spring 83 is fastened with one of its ends to the first-named lug 81 and with the other end to the second lug 82 to urge the frame 32 downwardly.

What I claim is:

1. For use with a wheel-supported vehicle, a vertically adjustable frame, an auger-type stalk cutter blade journalled on said frame on a substantially transverse horizontal axis, stalk engaging cutting teeth on the periphery of the auger blade, power actuated means operatively connected to said auger blade for rotating said blade reversely to the direction of travel, and a hood enclosing the top and rear portions of the auger blade.

2. For use with a tractor, a vertically adjustable frame adapted for mounting on the front end of the tractor, a shaft journalled on said frame on a substantially transverse horizontal axis, a cutter mounted on said shaft, said cutter comprising an auger-shaped body portion coaxially mounted on said shaft and a plurality of radially projecting stalk engaging cutting teeth spaced along the periphery of said auger-shaped body portion, power actuated means operatively connected to said cutter for rotating said cutter in such direction that the lowermost cutting teeth move reversely to the direction of travel, and a hood mounted on said frame enclosing the top and rear portions of the cutter.

JOHN J. HUITEMA.

REFERENCES CITED

The following references are of record in the file of this patent:

UNITED STATES PATENTS

| Number | Name | Date |
|---|---|---|
| 1,620,099 | Hover | Mar. 8, 1927 |
| 1,689,550 | Dick et al. | Oct. 30, 1928 |
| 2,000,249 | Pew | May 7, 1935 |